United States Patent [19]
Meyers

[11] Patent Number: 6,041,116
[45] Date of Patent: *Mar. 21, 2000

[54] METHOD AND APPARATUS FOR CONTROLLING OUTBOUND CALLS

[75] Inventor: John D. Meyers, Arlington, Tex.

[73] Assignee: Aspect Telecommunications Corporation, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,990

[22] Filed: May 5, 1997

[51] Int. Cl.[7] .................................................. H04M 3/00
[52] U.S. Cl. ........................ 379/244; 379/243; 379/134; 379/265
[58] Field of Search .................................... 379/265, 266, 379/309, 114, 115, 120, 242, 243, 196, 197, 198, 199, 200, 219, 133, 134, 283, 361, 418, 244

[56] References Cited

U.S. PATENT DOCUMENTS

| | | | |
|---|---|---|---|
| 5,247,569 | 9/1993 | Cave | 379/113 |
| 5,333,180 | 7/1994 | Brown et al. | 379/88.06 |
| 5,357,564 | 10/1994 | Gupta et al. | 379/207 |
| 5,581,602 | 12/1996 | Szlam et al. | 379/196 |
| 5,638,431 | 6/1997 | Everett et al. | 379/34 |
| 5,668,856 | 9/1997 | Nishimatsu et al. | 379/249 |
| 5,719,932 | 2/1998 | Roybal | 379/386 |
| 5,724,404 | 3/1998 | Garcia et al. | 379/196 |
| 5,739,919 | 4/1998 | Lee et al. | 379/100.01 |
| 5,838,781 | 11/1998 | Isaksson | 379/231 |
| 5,867,568 | 2/1999 | Ackerman et al. | 379/225 |

*Primary Examiner*—Scott Wolinsky
*Assistant Examiner*—Benny Q. Tieu
*Attorney, Agent, or Firm*—Blakely, Sokoloff Taylor & Zafman LLP

[57] ABSTRACT

A system for processing outbound calls includes a system controller that controls the placement of an outbound call to a called number. The called number placed by the system controller has an associated country. The system includes a storage mechanism that stores multiple sets of call classification parameters. Each set of call classification parameters is associated with a particular country. A call classifier is coupled to the system controller and the storage mechanism. The call classifier can classify the result of the outbound call based on call classification parameters associated with the target country. The call classification parameters can include call progress tones associated with the country to which the outbound call was placed. The call classifier can also classify the answer status of the outbound call.

31 Claims, 5 Drawing Sheets

100

| CODE | COUNTRY |
|---|---|
| 001 | UNITED STATES |
| 002 | CANADA |
| 003 | MEXICO |
| 004 | AUSTRALIA |
| 005 | AUSTRIA |
| 006 | BELGIUM |
| 007 | CYPRUS |
| 008 | DENMARK |
| 009 | FINLAND |
| 010 | FRANCE |
| 011 | GERMANY |
| 012 | GREECE |
| 013 | HONG KONG |
| 014 | ICELAND |
| 015 | IRELAND |
| 016 | ITALY |
| 017 | JAPAN |
| 018 | LUXEMBOURG |
| 019 | MALTA |
| 020 | NETHERLANDS |
| 021 | NORWAY |
| 022 | PORTUGAL |
| 023 | SINGAPORE |
| 024 | SOUTH AFRICA |
| 025 | SPAIN |
| 026 | SWEDEN |
| 027 | SWITZERLAND |
| 028 | UNITED KINGDOM |

FIG. 4

METHOD AND APPARATUS FOR CONTROLLING OUTBOUND CALLS

FIELD OF THE INVENTION

The present invention relates to call processing systems. More specifically, the invention provides a mechanism for initiating, monitoring, and processing outbound calls to multiple countries from a single system.

BACKGROUND

A call center is capable of receiving, generating, processing, and transmitting calls, such as telephone calls, and other information. A particular type of call center may be referred to as an automatic call distributor (ACD). A call center typically has multiple agents answering incoming calls and participating in outgoing call campaigns. Each agent may be assigned to a particular group, such as an inbound group or an outbound group.

During an outbound campaign, a system is provided for initiating the outbound calls and controlling the rate at which the calls are initiated. Additionally, this system must identify answered outbound calls and connect those calls to available agents. Various call progress tones and other signals provided on the telephone line indicate the status of the outbound call. However, the tones and signals used by various telephone networks can vary among different countries.

Existing call centers are capable of detecting tones and voice from a single country (e.g., the United States). In these systems, it is not possible to detect tones and voice from any country other than the country for which the call center is designed. Thus, the call center cannot be used to make calls to multiple countries, or a country different than the designated country. In this situation, a separate call center designed for use with a different country is required to make calls to another country.

Existing call centers use a separate system (e.g., a separate call switch) for each country. Each system is configured to identify the tones and signals used by the telephone network of a particular country. Therefore, if a particular call center must support outbound calls to six different countries, then six separate systems must be provided to support all possible call tones and signals. Since the separate systems are dedicated to a particular country, the system cannot accommodate calls placed to a different country. Thus, if a particular system has reached its outgoing call capacity, no additional calls can be initiated to that system's country because the other systems are dedicated to a different country. Even if other systems are not being used, they cannot process calls to a country other than the country for which they are configured to communicate. These existing call center designs often result in an inefficient utilization of resources.

Existing call center designs are particularly inefficient when a particular outbound campaign places all calls to the same country. In this situation, only one of the country-based systems is used to handle the outbound calls. The remaining systems are unused during this particular outbound campaign.

It is therefore desirable to provide a system for processing outbound calls that is capable of identifying the tones and signals used by telephone networks in multiple countries.

SUMMARY OF THE INVENTION

Embodiments of the present invention are related to a call processing mechanism capable of processing outbound calls. The call processing mechanism is capable of identifying the tones and signals used by telephone networks in multiple countries. Thus, a single mechanism is used for multiple countries, rather than providing a separate mechanism for each country to which calls may be initiated. This use of a single mechanism for multiple countries provides an efficient utilization of call center resources by sharing components and procedures for calls to multiple countries, rather than requiring dedicated, country-specific systems.

One embodiment of the invention provides an apparatus including a system controller that controls the placement of an outbound call to a called number, in which the called number has an associated country. The apparatus also includes a storage mechanism that stores multiple sets of call classification parameters. Each set of call classification parameters is associated with a particular country. The apparatus also includes a call classifier coupled to the system controller. The call classifier classifies the outbound call result based on call classification parameters associated with the country to which the call was placed.

In another embodiment of the invention, the call classifier is configured to classify the answer status of the outbound call.

An alternative embodiment of the invention provides a first call classifier that classifies a call result based on call classification parameters associated with a first country. A second call classifier classifies a call result based on call classification parameters associated with a second country. A system controller is coupled to the first call classifier and the second call classifier. The system controller controls the placement of an outbound call to a called number and selects the call classifier associated with the country associated with the called number to classify the outbound call result.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 4 illustrates an embodiment of a country code table used to identify a code associated with a particular country.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Embodiments of the present invention are related to a call processing mechanism capable of processing outbound calls. Specific embodiments of the invention are used in a call center environment. The call processing mechanism is capable of identifying the tones and signals used by telephone networks in multiple countries. Thus, a single mechanism is used for multiple countries, rather than providing a separate mechanism for each country to which calls may be initiated. This use of a single mechanism for multiple countries provides an efficient utilization of call center resources by sharing components and procedures for calls to multiple countries, rather than using dedicated, country-specific systems.

Figure 1:
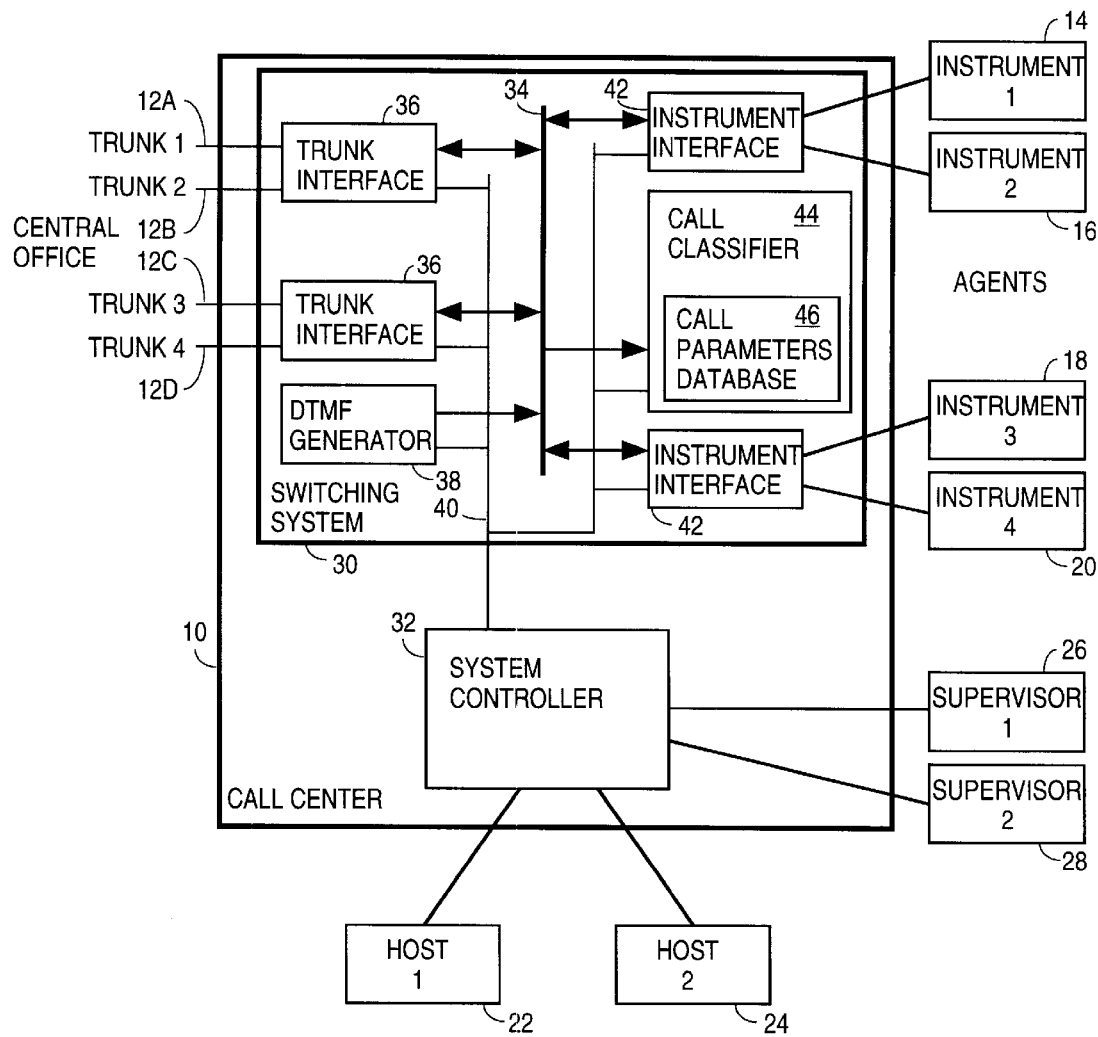
FIG. 1 illustrates an embodiment of an automated outbound calling environment including a call center coupled to multiple trunks, agents, hosts, and supervisor devices.

FIG. 1 illustrates an embodiment of an automated outbound calling environment including a call center 10 coupled to various trunks, agents, hosts, and supervisor devices. Call center 10 may be capable of outbound calling only, or a mixture of inbound and outbound calling. Call center 10 may also be capable of handling, electronic mail, facsimiles, network sessions (e.g., sessions across the Internet), or other information.

Multiple central office trunks 12a, 12b, 12c, and 12d are coupled to call center 10 and provide a communication link for receiving incoming calls and placing outbound calls. Although four trunks are shown in FIG. 1, a particular call center may be coupled to any number of trunks. Additionally, other communication links (not shown) may be coupled to call center 10 for communicating other types of information to and from the call center. These other types of information include electronic mail, facsimiles, and various types of network information and network-communicated data.

Each of the multiple trunks 12a–12d can be configured as an inbound trunk (for receiving incoming calls) or an outbound trunk (for transmitting outbound calls). Additionally, each of the multiple trunks 12a–12d can be configured as a two-way trunk capable of handling inbound calls and outbound calls. The configuration of trunks 12a–12d can be changed based on the requirements of the call center activities.

Several instruments 14, 16, 18, and 20 are coupled to call center 10. Although only four instruments are shown, a typical configuration may include hundreds or thousands of instruments coupled to the call center. Instruments 14–20 are used by agents to handle incoming or outgoing calls. An instrument can be a telephone set or other device that allows an agent to handle calls. Call center 10 distributes incoming calls to an instrument 14–20 configured to process incoming calls. Additionally, call center 10 can connect answered outgoing calls to instruments used by agents participating in an outbound campaign.

A pair of hosts 22 and 24 are coupled to call center 10. Hosts 22 and 24 can be any device capable of communicating with call center 10. Hosts 22 and 24 may be located near call center 10 (e.g., in the same building) or may be geographically distant from the call center. Although two hosts 22 and 24 are shown in FIG. 1, any number of hosts may be coupled to a particular call center. Each host 22 and 24 has a separate communication link to call center 10. In an alternate embodiment, hosts 22 and 24 are coupled to call center 10 through a network or other shared communication mechanism. Hosts 22 and 24 provide a mechanism for communicating information to and from call center 10.

In a particular embodiment of the invention, hosts 22 and 24 are processor-based systems using serial asynchronous RS-232 communication links to communicate with call center 10. Alternatively, hosts 22 and 24 may use a networking protocol such as Transmission Control Protocol/Internet Protocol (TCP/IP) to communicate with call center 10. The connections between call center 10 and hosts 22 and 24 are commonly referred to as Computer Telephony Integration (CTI) connections, which provide a mechanism for a computer system external to a switching system to receive information regarding calls in the switching system and to initiate activity or exert control over calls within the switching system.

A pair of supervisor devices 26 and 28 are coupled to call center 10. These supervisor devices 26 and 28 can be any type of device capable of communicating with call center 10, such as a terminal, or a processor-based system. Supervisor devices 26 and 28 monitor the overall operation of call center 10. For example, supervisor devices 26 and 28 may display statistics regarding overall agent efficiency, individual agent efficiency, or call center statistics, such as the number of calls waiting, the average wait of each call, or the longest waiting call currently in the queue. Although only two supervisor devices 26 and 28 are shown in FIG. 1, other call center configurations may include any number of supervisor devices.

Call center 10 includes a switching system 30 and a system controller 32. Switching system 30 includes a switching bus 34 coupled to trunk interfaces 36, a Dual-Tone Multi-Frequency (DTMF) generator 38, instrument interfaces 42, and a call classifier 44. Switching bus 34 is used to transmit digitized audio (e.g., tone or voice) signals between ports of the system (e.g., between an instrument and a trunk, between two instruments, or between the DTMF generator and a trunk). An embodiment of the invention uses 64 kbit/sec Pulse-Code Modulation (PCM) digital encoding for transmitting signals on switching bus 34.

A control bus 40 is coupled to system controller 32, trunk interfaces 36, DTMF generator 38, instrument interfaces 42, and call classifier 44. Control bus 40 provides a two-way signaling path for transmitting messages, commands, and other information between system controller 32 and the various components or modules in switching system 30. For example, trunk interfaces 36 and instrument interfaces 42 use control bus 40 to communicate detected events (e.g., incoming off-hook on a trunk or key depressed on an instrument) to system controller 32.

Trunk interfaces 36 support one or more connected trunks, such as analog and digital (T1) trunks. In a particular embodiment of the invention, an analog trunk interface may be coupled to eight central office trunks and a digital trunk interface may be coupled to one or two digital T1 trunks, each capable of carrying multiple voice conversations simultaneously. Instrument interfaces 42 are each coupled to multiple instruments, such as telephone sets. In one embodiment of the invention, sixteen instruments can be coupled to a single instrument interface. Although only two trunk interfaces 36 and two instrument interfaces 42 are shown in FIG. 1, a particular call center may have any number of trunk interfaces and any number of instrument interfaces.

DTMF generator 38 is a shared resource which provides multiple simultaneous ports capable of generating standard DTMF tones for outbound dialing. Ports of DTMF generator 38 are dynamically allocated for outbound dialing on trunks as required.

Call classifier 44 is a shared resource which provides multiple simultaneous ports capable of detecting and classifying various tones, voice, answering machines, and other tones or signals on outbound calls. The ports of call classifier 44 are dynamically allocated as required for detection and classification of outbound call results based on received audio signals. In a particular embodiment of call center 10, call classifier 44 is capable of supporting (i.e., detecting and classifying) 64 outbound calls simultaneously. Embodiments of call center 10 may include multiple call classifiers 44 to increase the number of supported outbound calls.

Although not shown in FIG. 1, call classifier 44 includes a control processor and a digital signal processor (DSP). The control processor manages overall activity of call classifier 44 and communicates with system controller 32 via control bus 40. The DSP executes algorithms which implement tone and voice detection for multiple channels simultaneously. Digital PCM data is received by call classifier 44 from switching bus 34. As determined by control messages received from system controller 32, call classifier 44 passes PCM information in selected PCM timeslots (which correspond to the trunk interface from which call progress signals are being received) to the DSP for analysis. The control processor and the DSP may execute algorithms which are stored in an Erasable Programmable Read-Only Memory (EPROM) contained in call classifier 44. Alternatively, the algorithms may be stored in another storage device within call classifier 44 or downloaded to call classifier 44 from system controller 32.

Call classifier 44 includes a call parameters database 46 containing one or more tables which describe frequencies, cadence, and other information regarding all call progress tones (e.g., busy, fast busy, or ringback) for each country to which outbound calls may be directed. Fast busy is also referred to as a "reorder" or "congestion" tone. These call classification parameters also include network Special Information Tones (SIT) used to indicate calling or dialing errors. Additionally, call parameters database 46 contains parameters for each country which are used to determine whether the detected voice is from an answering machine or a live human. Answering machine detection is performed by analyzing the durations of the first speech segment and the first subsequent silence segment received from the outbound trunk. For example, a long silence segment (such as "Hello . . . ") can indicate a live human voice because nothing follows the initial "Hello." Similarly, a short silence segment (such as "Hello you have reached") can indicate an answering machine. Telephone answering characteristics vary from country to country such that accurate detection of an answering machine or a live human voice requires a unique set of detection parameters for each country. For example, in some countries (such as the United States) it is common to answer a telephone call "Hello." However, in other countries, the "Hello" is typically followed by the called party announcing their name or telephone number. Thus, the call parameters associated with each country identify these differences.

In a particular embodiment of the invention, call parameters database 46 is stored in an EPROM contained in call classifier 44. In other embodiments, call parameters database 46 may be downloaded from system controller 32 to call classifier 44 during initialization. In another embodiment, system controller 32 transmits the parameters associated with the target country to call classifier 44 along with the "start detection" message (discussed below) for each call. In other embodiments, call parameters database is located outside call center 10 (e.g., in host 22 or 24).

Call parameters database 46 contains tone and voice parameters for multiple countries. Call classification is started upon receipt of a "start detection" command from system controller 32. This command includes identification of the PCM timeslot in which audio information from the trunk appears and identification of the country to which the call has been placed. The control processor in call classifier 44 causes the correct PCM data for that trunk to be routed to the DSP and communicates the country identification to the DSP. The "start detection" command also includes other parameters which control call classification for each particular call. These other parameters include, for example, an indication whether answering machine detection is enabled and the timeout duration for classifying a call as "no answer." When call classification begins for each call, the DSP identifies the call parameters in call parameters database 46 associated with the target country number (e.g., country code number) for the call and uses those parameters for that call.

Call classifier also includes a set of switches (not shown) which identify the "local country" (i.e., the country in which call center 10 is located). These switches may be manual switches or "software switches" or registers. During initialization, the control processor reads the position of the switches (or the register values) and passes the switch position information to the DSP. The DSP is then able to detect tones from either the local country or from the target country for each call. Call classifier 44 is capable of detecting tones and voice from any supported country at any time in any combination on each of the channels supported by the call classifier, using the parameters associated with the local country and the target country associated with each call.

System controller 32 uses control bus 40 to communicate commands and other information to the various components in call center 10. For example, system controller 32 may communicate commands instructing a trunk to go off-hook or on-hook, turn an instrument LED on or off, send a sequence of DTMF digits, or make a digital PCM switching bus connection. In a particular embodiment of the invention, system controller 32 is a general-purpose computer including a processor, memory, disk storage device, tape backup device, connections to serial asynchronous terminals/printers, and local area network (LAN) connections. System controller 32 provides overall control of call center 10, including all connections in the switching system, and management of shared resources such as call classifier 44, instruments 14–20, DTMF generator 38, and trunks 12a–12d.

Call center 10 illustrates various components, modules, interfaces, and buses used to implement embodiments of the invention. However, call center 10 may include other resources (not shown) to perform various operations. These other components may include one or more DTMF receivers, analog telephone interfaces, and other resources for processing calls and other information within the call center. For example, an embodiment of call center 10 includes a voice system for storing and retrieving voice messages. The voice system operates under control of system controller 32 and has multiple interface ports in the switching system for receiving and transmitting digitized audio signals. The voice system includes a control processor and storage devices for storage and retrieval of digitized voice data. The voice system can be used for a voice mail function, audio prompts, and DTMF digit collection. In an automated outbound calling application, the voice system can be used to deliver a voice message to an answering machine of the called party after call classifier 44 has determined that a call has been answered by an answering machine.

One or more hosts coupled to a particular call center may implement an outbound call management system (OCMS). Alternatively, calling list and scheduling/pacing of outbound calls can be performed by a system controller (e.g., system controller 32 in FIG. 1) or another device within the call center.

In another embodiment of the invention, call center 10 includes multiple call classifiers 44. Each call classifier 44 is capable of detecting tone and voice parameters for a particular country. For example, a first call classifier is a U.S.—only classifier, another is a Germany—only classifier, and another is a Japan—only classifier. The multiple call classifiers 44 are controlled by system controller 32. When a particular outbound call is to be placed, system controller 32 selects a call classifier 44 that is capable of detecting tones, voice characteristics, and other call progress tones associated with the target country. In this embodiment, a separate call classifier 44 is required for each country supported by call center 10.

Figure 2A:
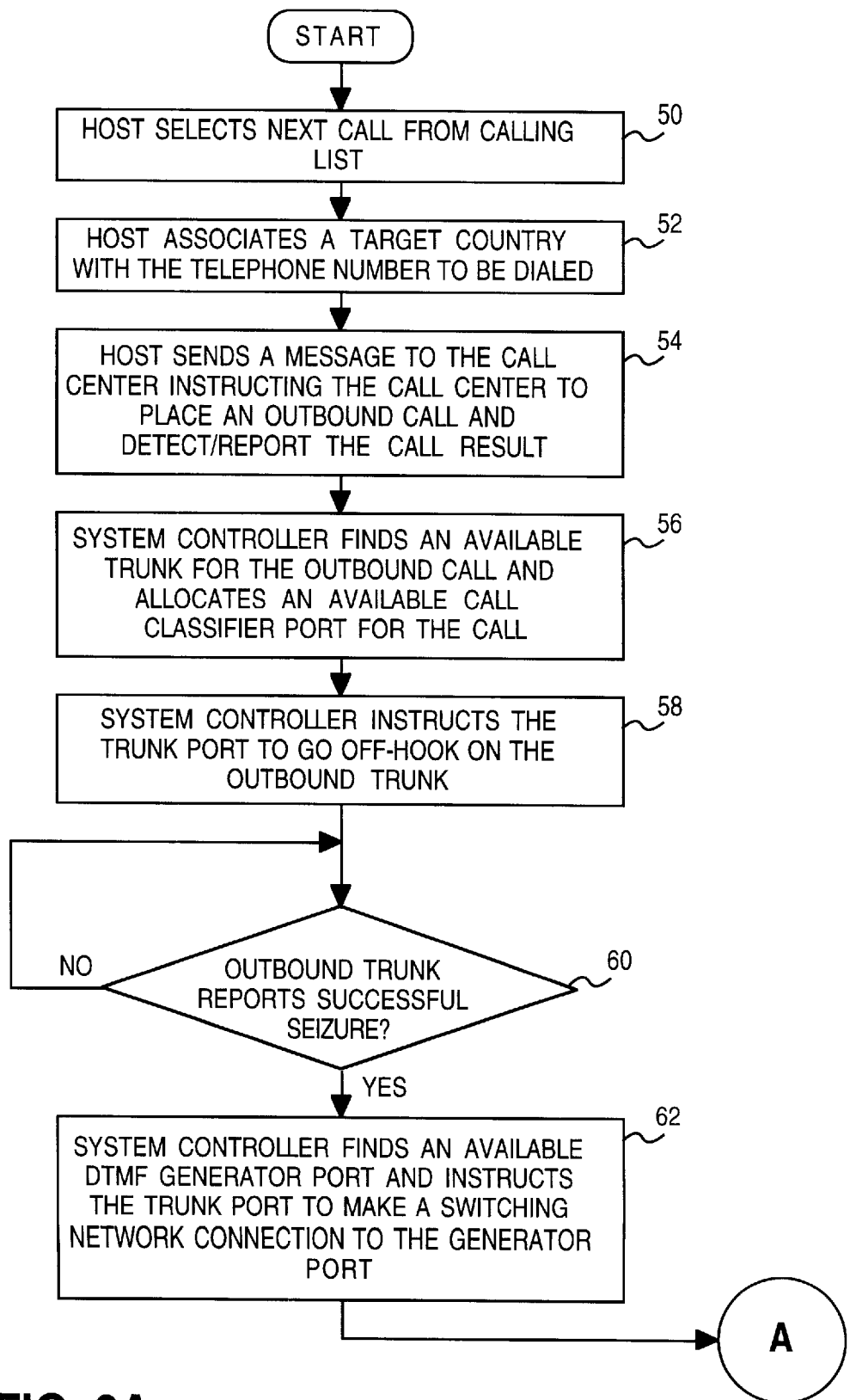
FIGS. 2A and 2B represent a flow diagram illustrating an embodiment of a procedure for processing outbound calls.
Figure 2B:
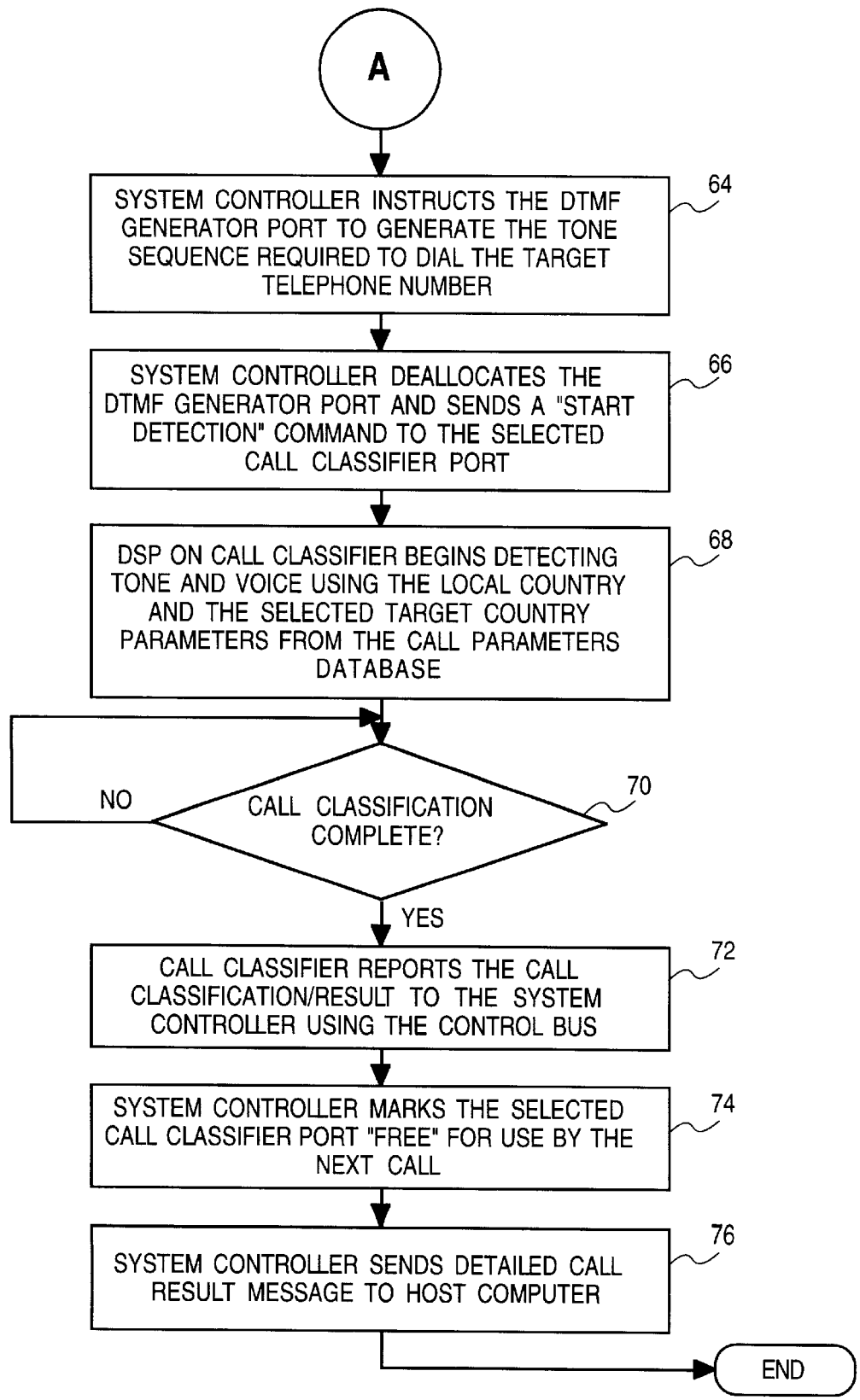
Figure 3:
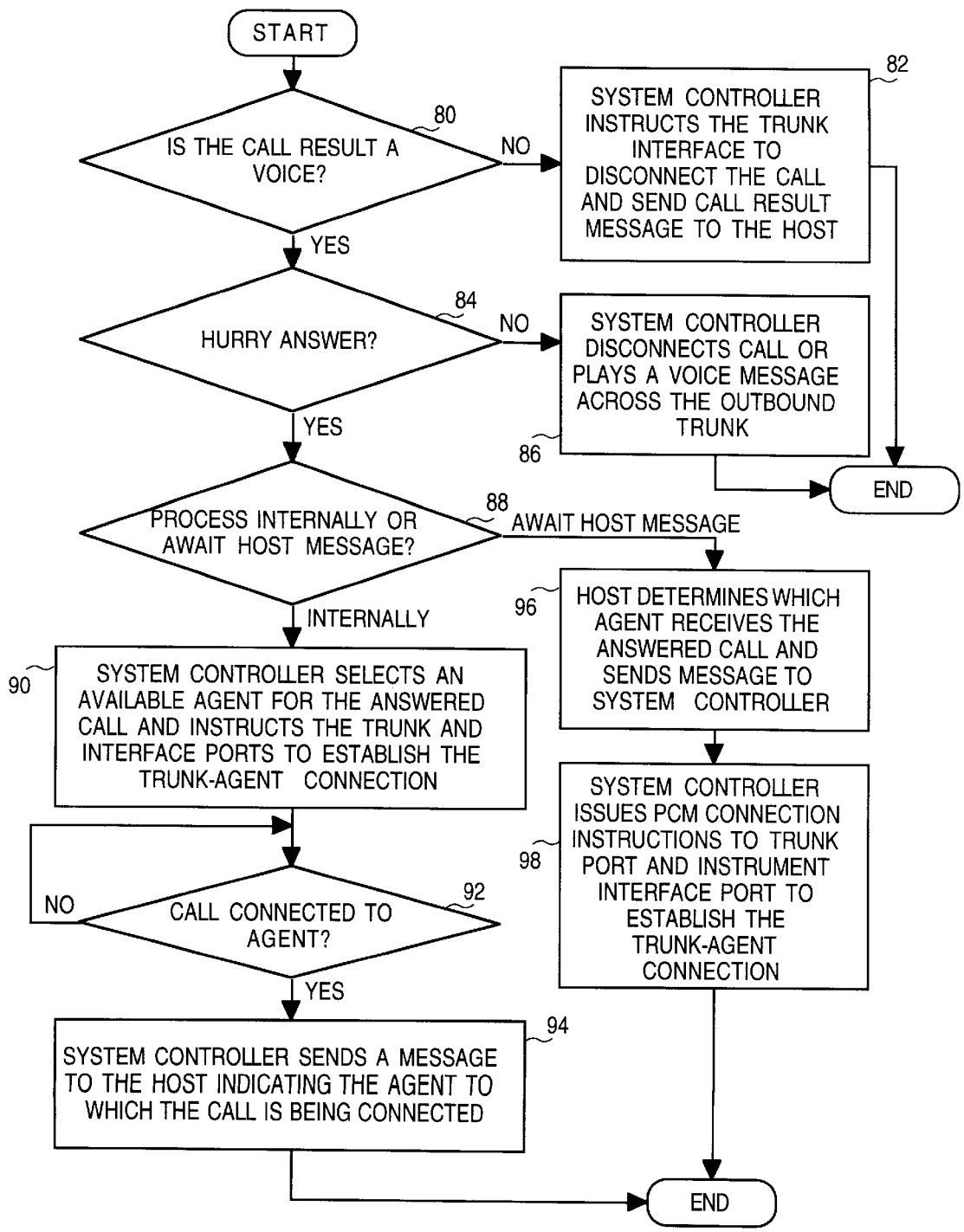
FIG. 3 is a flow diagram illustrating an embodiment of a procedure for classifying an outbound call.

FIGS. 2A and 2B represent a flow diagram illustrating an embodiment of a procedure for processing outbound calls. The procedures illustrated in FIGS. 2A, 2B, and 3 are implemented in an environment having a host coupled to a call center (e.g., the environment illustrated in FIG. 1). However, similar procedures can be used in other environments (e.g., environments in which the outbound calls are managed by a device located within the call center).

At step 50, the host selects the next number to call from a calling list. The host associates a target country with the telephone number to be dialed at step 52. The procedure continues to step 54, in which the host sends a message to the call center instructing the call center to place an outbound call and detect and report the call result to the host. The message sent at step 54 includes an identification of the target country. Alternatively, the host can send the full telephone number to the call center. In this situation, system controller 32 or call classifier 44 identifies the country associated with the telephone number using the country code contained within the telephone number.

At step 56, the system controller finds an available trunk for the outbound call and allocates an available call classifier port for the outbound call. The system controller then instructs the trunk port to go off-hook on the outbound trunk at step 58. Next, step 60 determines whether the outbound trunk has reported a successful seizure. A successful seizure refers to the establishment of a connection to the central office for dialing purposes. If a successful seizure has not yet been reported, then the procedure continues to execute step 60 until a seizure is reported.

In a particular embodiment of the invention, a timeout mechanism is used in combination with step 60 to avoid generating an infinite loop. If, after a particular time period, no seizure is detected then the trunk is marked as bad and the procedure returns to step 56 where the system controller finds another trunk for the outbound call.

When step 60 determines that a successful seizure is reported, the procedure continues to step 62 where the system controller finds an available DTMF generator port and instructs the trunk port to make a switching network connection to the generator port. This switching network connection involves the establishment of a connection between a trunk interface and a DTMF generator port using the switching bus. From step 62, the procedure continues to step 64 in FIG. 2B.

At step 64, the system controller instructs the DTMF generator port to generate the tone sequence required to dial the target telephone number. In an alternate embodiment, step 64 is implemented using Integrated Services Digital Network (ISDN) messaging from the trunk interface on a digital T1 trunk to the central office instead of DTMF dialing. At step 66, the system controller deallocates the DTMF generator port and sends a "start detection" command to the selected call classifier port. This command includes the switching bus timeslot of the outbound trunk, the target country for this call, and various other call classification parameters received from the host. At step 68, the DSP on the call classifier begins detecting tone and voice using the local country call classification parameters and the selected target country call classification parameters from the call parameters database. The call classification parameters include the frequency or frequencies, cadence, and sequence for each call progress or other tone that may be received from the telephone network of the local or target country or from an answering device. Call classification parameters also include timing parameters (relevant for the target country) used for determining whether a received voice signal should be classified as a human answer or an answering machine.

When processing outbound calls, the call classifier detects various call progress tones for the identified country as well as the local country in which the call center is located. It is necessary to monitor the local country call progress tones because various tones and SIT may be generated by the local country if a calling or dialing error occurs, even though a foreign number was dialed. For example, the call classifier detects a busy signal if it identifies a cadence tone that matches either the target country parameters or the local country parameters. Similarly, the call classifies other call results using both the target country parameters and the local country parameters.

Step 70 of FIG. 2B determines whether the call classification is complete. The call classification is complete when the call classifier detects a terminating tone (e.g., a busy, fast busy, or SIT), detects a human or answering machine voice, detects a modem or fax machine, or a timeout occurs. A timeout occurs if no tone or voice is detected after a particular time period (e.g., 30 seconds). If an unrecognized tone or other signal occurs, then the procedure may classify the call as "unclassifiable tone detected." Additional details regarding the call classification procedure are discussed below with respect to FIG. 3.

At step 72, the call classifier reports the call classification or call result to the system controller using the control bus. At step 74, the system controller then marks the selected call classifier port "free" for use by the next call. The procedure then continues to step 76 where the system controller sends a detailed call result message to the host computer using, for example, a CTI communication link. The procedure then terminates, having completed processing of the outbound call.

FIGS. 2A and 2B illustrate a procedure for processing a particular outbound call. Multiple instances of this procedure may be executed in parallel to process multiple outbound calls simultaneously. The multiple outbound calls may be associated with different countries having different call classification parameters.

FIG. 3 is a flow diagram illustrating an embodiment of a procedure for classifying an outbound call. At step 80, the procedure determines whether the call result was a voice detection. If the call result was not a voice detection (e.g., busy, fast busy, ring no answer, modem or fax answer tone, SIT, or unclassifiable tone), then the procedure branches to step 82. At step 82, the system controller instructs the trunk interface port to disconnect the call and the system controller sends a call result message to the host. If a modem or fax machine was detected, the host may generate a message indicating that the called number should be deleted from the list of possible numbers, thereby preventing the number from being used again in the future.

If step 80 determines that the call result was a voice detection, then the procedure continues to step 84 where the procedure determines whether a human answered. If a human did not answer (i.e., an answering machine answered the call), then the procedure branches to step 86. At step 86, the procedure (based on the call handling database in the system controller) either disconnects the call or plays a voice message from the voice system across the outbound trunk to the called party's answering machine. This voice message may be, for example, a request for the called party to return the call. In an alternative embodiment, the determination of whether to leave a message on the answering machine is performed by the host coupled to the call center. The voice system generating the voice message may be contained within the call center or located external to the call center.

If step 84 determines that a human answered the call, then the procedure continues to step 88 where the procedure determines whether the answered call should be processed internally (i.e., by the call center) or processed by the host. This determination is performed based on information contained in the call handling database in the system controller. If the answered call is to be processed internally, then the procedure continues to step 90 where the system controller selects an available agent for the answered call and instructs the trunk and instrument interface ports to establish the digital PCM connections required to connect the answered call to the agent.

The procedure then continues to step 92 to determine whether the call has been connected to the agent. Step 92 is repeated until the call is connected to the agent. A timeout mechanism may be provided which selects another agent if the connection cannot be established within a particular period of time. When the call is connected to an agent, the procedure continues from step 92 to step 94 where the system controller sends a message to the host indicating the agent to which the answered call is being connected. This allows the host to present to the agent's terminal or workstation screen information concerning the answering party.

If step 88 determines that the answered call should be processed by the host, then the procedure branches to step 96 to await instructions from the host regarding further processing of the call. At step 96, the host determines which agent should receive the answered call and sends a message to the system controller indicating the identity of the selected agent. The procedure then continues to step 98 where the system controller issues PCM connection commands to the trunk port and the instrument interface port to make the specified trunk-agent connection. At the same time, the host presents to the terminal or workstation screen of the selected agent information concerning the answering party.

After the answered call has been handled by the selected agent, either the trunk or the agent releases (e.g., hangs up) the call. The system controller then sends a message to the host indicating the disconnection. The host may also terminate the call by sending an appropriate "release call" message to the system controller.

FIG. 4 illustrates an embodiment of a country code table 100 used to identify a code associated with a particular country. Table 100 illustrates various three-digit codes, each associated with a specific country. These codes can be used by the call classifier (FIG. 1) to determine which call classification characteristics are associated with a particular call. In an alternate embodiment of the invention, the system controller or call classifier determines the country associated with the called number directly from the telephone number itself (e.g., using the country code contained within the telephone number).

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. An apparatus for processing outbound calls, the apparatus comprising:

a system controller to control placement of an outbound call to a called number, wherein the called number has an associated country;

a storage mechanism to store a plurality of sets of call classification parameters, wherein each set of call classification parameters is associated with a particular country and is indicative of a set of outbound call results for outbound calls to the particular country, the set of outbound call results including at least one answered result and at least one unanswered result; and a call classifier coupled to the system controller, wherein the call classifier is to generate an outbound call result for the outbound call based on call classification parameters associated with the country associated with the called number, the generated outbound call result being either an answered result, indicating that the outbound call was answered, or an unanswered result, indicating that the call was not answered.

2. The apparatus of claim 1 wherein the call classification parameters include call progress tones associated with the country to which the outbound call was placed.

3. The apparatus of claim 1 wherein the call classification parameters include call tone frequencies used by the country associated with the outbound call.

4. The apparatus of claim 1 wherein the call classification parameters include Special Information Tones (SIT).

5. The apparatus of claim 1 wherein the call classification parameters include parameters for determining whether a person answered the outbound call.

6. The apparatus of claim 1 wherein the call classification parameters include parameters for determining whether a device answered the outbound call.

7. The apparatus of claim 1 wherein the call classification parameters include parameters for determining whether an answering machine answered the outbound call.

8. The apparatus of claim 1 wherein the apparatus is contained in a call center.

9. The apparatus of claim 1 wherein the apparatus is coupled to a call center.

10. The apparatus of claim 1 wherein the answered call result indicates whether a person or a device answered the call.

11. The apparatus of claim 1 wherein the unanswered call result indicates whether the called number could not be reached, whether the called number was busy or whether the called number rang but was not answered.

12. An apparatus for processing outbound calls, the apparatus comprising:

a first call classifier to generate a first call result based on call classification parameters, associated with a first country, that are indicative of call results for calls to the first country;

a second call classifier to generate a second call result based on call classification parameters, associated with a second country, that are indicative of call results for calls to the second country; and a system controller coupled to the first call classifier and the second call classifier, wherein the system controller is to control placement of an outbound call to a called number, and wherein the system controller is to select the first or the second call classifier, according to the country associated with the called number, to generate the first or the second call result respectively, the first or second call result being either an answered result, indicating that the outbound call was answered or an unanswered result, indicating that the outbound call was not answered.

13. The apparatus of claim 12 wherein the call classification parameters associated with the first call classifier include call progress tones associated with the first country and the call classification parameters associated with the second call classifier include call progress tones associated with the second country.

14. The apparatus of claim 12 wherein the call classification parameters identify whether a person answered the outbound call.

15. The apparatus of claim 12 wherein the apparatus is contained in a call center.

16. The apparatus of claim 11 wherein the answered call result indicates whether a person or a device answered the call.

17. The apparatus of claim 12 wherein the unanswered call result indicates whether the called number could not be reached, whether the called number was busy or whether the called number rang but was not answered.

18. A method of processing outbound calls, the method comprising:

initiating an outbound call to a called number, wherein the called number has an associated called number country;

determining from a plurality of sets of call classification parameters, a first set of call classification parameters associated with the called number country and indicative of a set of call results for calls to the called number country;

monitoring the outbound call using the first set of call classification parameters associated with the called number country; and generating an outbound call result using the first set of call classification parameters associated with the called number country, the generated outbound call result being either an answered result, indicating that the outbound call was answered, or an unanswered result, indicating that the call was not answered.

19. The method of claim 18 further including monitoring the outbound call using a second set of call classification parameters associated with a country from which the outbound call originated.

20. The method of claim 18 wherein the first set of call classification parameters associated with the called number country include call tone frequencies used by telephone networks in the called number country.

21. The method of claim 18 wherein the first set of call classification parameters associated with the called number country include Special Information Tones (SIT).

22. The method of claim 18 wherein the first set of call classification parameters associated with the called number country include parameters for determining whether a person answered the outbound call.

23. The method of claim 18 wherein the call first set of classification parameters associated with the called number country include parameters for determining whether a device answered the outbound call.

24. The method of claim 18 wherein the method is performed by a call center.

25. The method of claim 18 wherein the answered call result indicates whether a person or a device answered the call.

26. The method of claim 18 wherein the unanswered call result indicates whether the called number could not be reached, whether the called number was busy or whether the called number rang but was not answered.

27. An apparatus for processing outbound calls, the apparatus comprising:

means for controlling placement of an outbound call to a called number, wherein the called number has an associated country;

means for storing a plurality of sets of call classification parameters, wherein each set of call classification parameters is associated with a particular country and is indicative of a set of outbound call results for outbound calls to the particular country; and means for generating an outbound call result based on call classification parameters associated with the country associated with the called number, wherein the means for detecting is coupled to the means for controlling and wherein the generated outbound call result is either an answered result, indicating that the call was answered, or an unanswered result, indicating that the call was unanswered.

28. The apparatus of claim 27 wherein the call classification parameters include call progress tones associated with the country to which the outbound call was placed.

29. The apparatus of claim 27 wherein the call classification parameters include parameters for determining whether a person answered the outbound call.

30. The apparatus of claim 27 wherein the apparatus is contained in a call center.

31. The apparatus of claim 27 wherein the apparatus is coupled to a call center.

* * * * *